United States Patent [19]
Brown

[11] 3,766,743
[45] Oct. 23, 1973

[54] UNDERWATER PIPELINE INSTALLATION
[75] Inventor: Robert J. Brown, Rotterdam, Netherlands
[73] Assignee: Esso Production Research Company, Houston, Tex.
[22] Filed: May 12, 1972
[21] Appl. No.: 252,683

[52] U.S. Cl. .................................. 61/72.3, 166/.6
[51] Int. Cl. ............................................. F16l 1/00
[58] Field of Search ..................... 61/72.3, 72.1; 166/.6

[56] References Cited
UNITED STATES PATENTS
| | | | |
|---|---|---|---|
| 3,690,112 | 9/1972 | Pattison | 61/72.3 |
| 3,525,226 | 8/1970 | McCarron | 61/72.3 |
| 3,616,651 | 11/1971 | Chang et al. | 61/72.3 |
| 3,503,219 | 3/1970 | Houot | 61/72.3 |

Primary Examiner—Jacob Shapiro
Attorney—James A. Reilly et al.

[57] ABSTRACT

A method for the installation of an underwater pipeline on the bottom of a body of water by towing a first elongated pipeline section having a trailing end mounted on a first underwater sled into position on the bottom of the body of water, pulling a second elongated pipeline section having a leading end mounted on a second underwater sled into position on the bottom of the body of water behind the first pipeline section and in longitudinal alignment therewith, moving the second sled into end-to-end engagement with the first sled, and thereafter connecting the leading end of the second pipeline section to the trailing end of the first pipeline section.

10 Claims, 9 Drawing Figures

UNDERWATER PIPELINE INSTALLATION

BACKGROUND OF THE INVENTION

1. Field of the Invention

This invention relates to the installation of underwater pipelines and is particularly concerned with pipeline installation methods in which pipeline sections are pulled into place on the bottom of a body of water and connected together to complete the line.

2. Description of the Prior Art

Methods for the installation of underwater pipelines which have been developed in recent years include the bottom-pull method wherein the pipeline is fabricated onshore, launched into the water, and then pulled into position along the bottom by means of winches mounted on a moored barge or the opposite shore. This method is generally limited to the installation of relatively short lines because of the high pulling forces required to move heavy strings of pipe over long distances. It has been suggested that this difficulty might be avoided by pulling relatively short sections of pipe into position adjacent one another and then joining these sections in place but this is normally not practical except in very shallow water. The difficulties encountered in properly positioning and aligning the pipe sections and then connecting them in deep water make this approach very time consuming and expensive. Other methods which permit the connection of pipe sections at the surface are therefore generally used.

SUMMARY OF THE INVENTION

This invention provides an improved method for the installation of underwater pipelines by pulling elongated pipe sections into place and then joining them on bottom which alleviates many of the difficulties referred to above. In accordance with the invention, the elongated sections to be used in constructing the pipeline are made up onshore and launched into the water. The first section is fitted with a sled which carries the trailing end of the pipe and serves as a guide for a similar sled on the leading end of the next pipe section. This first section is pulled to the desired location on bottom by means of cables extending from a moored barge or similar vessel. A line from a tug or other vessel can be attached to the end of the first section to hold it back as the section is pulled into place and thus assure proper positioning of the section if desired.

After the first pipeline section has been pulled to the desired final location, a second pipeline section equipped with a pulling sled at the leading end is pulled into a predetermined location near the trailing end of the first section. The pulling cables extending from the sled on the second section to the pulling barge are slacked off until they rest on the ocean floor in the immediate vicinity of the sled on the first pipeline section. These cables are then inserted in cable guides or similar members on the first sled by divers or manipulators. Pulling of the second section is then resumed until the second sled has been moved into end-to-end engagement with the first sled. Movement of the first sled during the pulling operation can be controlled by flooding the sled to increase its weight or by installing anchors or similar devices if necessary but this is usually not required. Engagement of the second sled with the first results in alignment of the two pipeline sections so that they can be connected together. Underwater television and other sensing equipment can be employed to monitor the positioning of the second sled as necessary. After the sleds have been engaged, they are locked together to hold them in place and the pulling cables are removed.

Once the two sleds have been engaged and locked together, the two aligned pipeline sections can be connected to one another by divers using underwater welding equipment or mechanical connecting devices or by means of remote connectors lowered into place on guide lines from a barge or other vessel. Subsequent pipeline sections are pulled into position, aligned with the preceding sections, and connected into place in similar manner. The use of sleds fitted with cable guides or similar members to position and align the adjacent sections so that the connections can be made permits significant reductions in the time required for the installation of such underwater pipelines, reduces installation costs, and often permits operation under weather conditions that may preclude the use of other methods.

DESCRIPTION OF THE PREFERRED EMBODIMENTS

Figure 1:
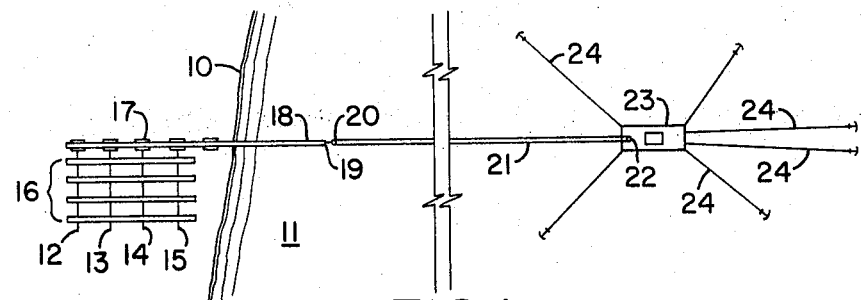
FIG. 1 in the drawing is a view from above showing the fabrication and launching of the first pipeline section during the installation of an underwater pipeline in accordance with the invention.

FIG. 1 in the drawing is a view from above of an onshore pipe launching site from which the method of the invention is to be carried out. This site will normally be located near the shoreline 10 where the pipeline is to enter the water 11. The equipment provided includes pipe supports 12, 13, 14, and 15 on which individual sections of pipe are placed and welded together to form longer sections 16. These sections are moved down the pipe supports onto pipe launching ramp 17 which extends downwardly into the water. After it has been moved onto the pipe ramp 17, each pipe section 16 is welded to the preceding section to form an elongated pipe section 18. The welding, inspection and coating equipment used in making up the elongated pipe sections at the launching site is not shown in the drawing. This equipment may be of any conventional type and will be familiar to those skilled in the art.

As shown in FIG. 1 of the drawing, the initial pipe section 18 being fabricated at the launching site has been provided with a pulling head 19 which prevents the entry of water into the line and is equipped with a padeye or similar device for the attachment of a sheave 20 to the end of the line. A cable 21 extends from a winch 22 on a moored barge 23, through the sheave, and back to the barge. The barge is moored offshore on the pipeline route, the mooring lines being indicated by reference numerals 24. The initial position of the barge will depend primarily upon the length of the pipeline sections to be employed. This in turn is governed by the type of bottom over which the pipe is to be pulled, the diameter of the pipe, and the pulling capacity of the barge or other vessel to be used. It is generally preferred to employ pipeline sections of from about 1 to about 10 miles in length. Relatively long sections can be used with pipe of from 6 to 12 inches in diameter but larger pipe generally necessitates the use of shorter sections or the use of auxiliary bouyancy.

Figure 2:
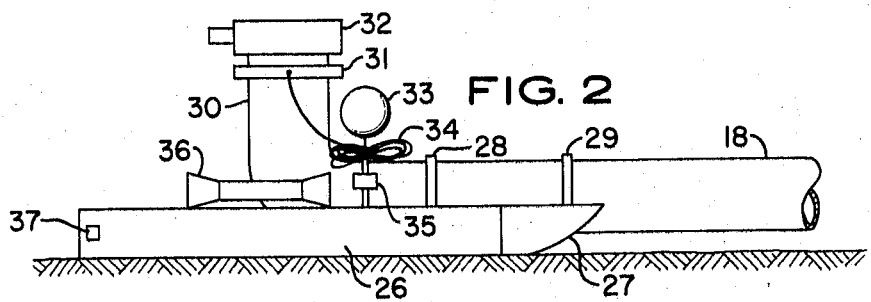
FIG. 2 is an enlarged, schematic view of the trailing end of the first pipeline section showing the pulling sled on which the trailing end is mounted.

The trailing end of the first pipe section 18 is mounted on sled 26 as shown in FIG. 2 of the drawing. The sled, which may be constructed from I-beams, steel plate, reinforced concrete, or similar material and may include provisions for flooding to increase its weight, is a long, flat vehicle provided with rounded runners 27 to facilitate its movement over uneven bottom terrain. The rear end of the vehicle contains a V-shaped indentation, not shown in the drawing, for engaging the front end of a sled supporting the leading end of an adjacent pipeline section. The end of pipeline section 18 is held in place on sled 26 by means of clamps 28 and 29 or similar members. The pipe on the sled terminates in an upturned ell 30 provided with a flange 31 over which a remote connector may be lowered. The end of the ell is preferably sealed by a valve or similar member 32 that can be opened or removed manually by a diver or actuated from a remote location. The particular system employed will depend primarily upon the water depth in which the operation is to be carried out. In water depths where divers can operate effectively, a manually operated flooding valve will normally be used. In deeper waters, a remotely actuated system will be employed. Various systems for the remote actuation of valves and the like have been developed and may be used for purposes of the invention.

The sled shown in FIG. 2 is also provided with a buoy 33 which is attached to a flexible line 34 and held in place by a clamp 35 that can be released from the surface in response to a sonic impulse or other signal. The other end of the flexible line may be attached to the ell as shown for use as a guide line during subsequent operations or may instead by connected to a conventional socket into which a heavier guide line can be lowered from the water's surface. Cable guides 36, only one of which is shown in FIG. 2, are positioned on each side of the sled for use in pulling a following sled into engagement with sled 26. These cable guides may be open on the bottom to facilitate insertion of the cable without parting it or may be tubular members through which the cable can be passed. Pulleys or similar members beneath which the cable can be passed may also be used and may be preferred from the standpoint of reducing friction as the cable is pulled. A latching socket 37 or the like is located on each side of the sled near the rear thereof.

Figure 3:
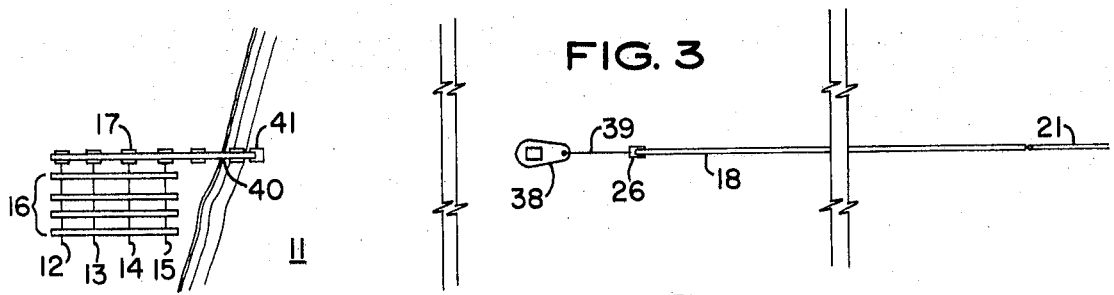
FIG. 3 is a view similar to FIG. 1 showing the operation at a later stage during installation of the pipeline.
Figure 4:
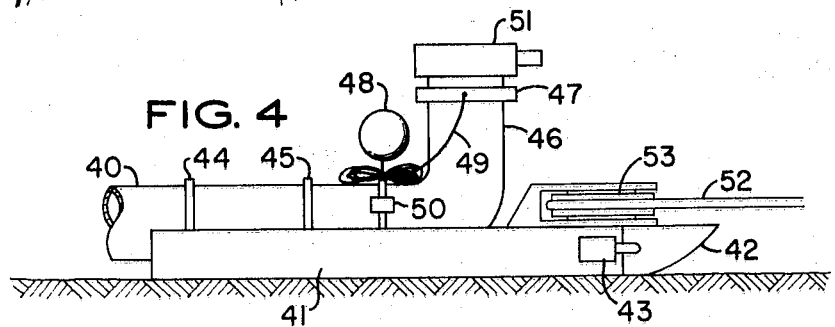
FIG. 4 is an enlarged, schematic view of the leading end of the second pipeline section showing the pulling sled used to support the leading end of the second section.

FIG. 3 in the drawing is a view of the launching site and adjacent water after the first pipeline section 18 fitted with sled 26 has been launched and pulled into position with cable 21. Barge 23 does not appear in FIG. 3. As indicated earlier, a tug 38 may be connected to the sled 26 by a line or cable 39 during the pulling operation to insure that the pipeline section extends along the pipeline route and is not deflected by currents or irregularities on the ocean floor. A second pipeline section 40 is being fabricated on pipe supports 12 through 15 and launching ramp 17 in much the same way that the earlier section was constructed. A pulling sled 41, shown in more detail in FIG. 4 of the drawing, has been provided at the leading end of pipeline section 40 and will be used to pull the second pipeline section into place. Sled 41 is similar to sled 26 in FIG. 2 but is designed to accommodate the leading end, rather than the trailing end, of a pipeline section. The front end 42 of sled 41 is shaped so that it will fit into the recess at the rear of sled 26. A latching or locking device 43, shown schematically in FIG. 4, is provided to hold the two sleds together after they have been engaged. This latching device may be an automatic coupling device having spring loaded detents which will snap into place when the two sleds are properly engaged. The end of the pipeline, held in place by clamps or similar members 44 and 45, is provided with an upturned ell 46 having a flange 47 similar to the ell and flange on the trailing end of pipeline section 18. A releasable buoy 48 connected to the ell by a flexible line 49 provides access to the ell from the surface. Release mechanism 50 may be identical to that on the earlier sled. The end of the ell may be sealed by means of a valve or similar member 51 of the type described earlier. A pulling cable 52 extends about a sheave 53 mounted near the front end of the sled. As pointed out previously, this pulling cable extends to the pulling barge or other vessel used to pull the second pipeline section into position on the ocean floor adjacent the first section.

Figure 5:
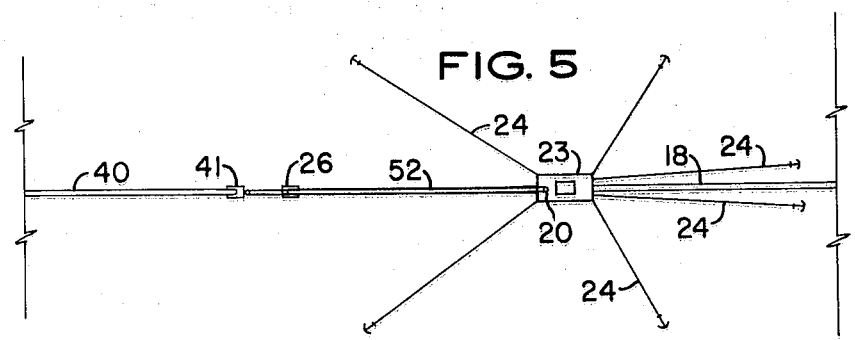
FIG. 5 is a view from above during positioning of the second pipeline section with respect to the first pipeline section.

After the first pipeline section has been pulled into the desired final position on the ocean floor and the second section has been pulled up to within a predetermined distance from the end of the first section, pulling of the second section is halted. The preferred spacing between the ends of the two sections at this point will depend in part upon the size and flexibility of the pipe being used and the conditions on the bottom. Generally, however, the second section will be stopped several hundred yards or more short of the end of the first section as shown in FIG. 5 of the drawing. The barge 23 should be moored well ahead of sled 26 so that the pulling cable 52 will extend in an essentially horizontal direction adjacent the front sled. The pulling cable 52 is then let out until it sags onto the ocean floor adjacent sled 26 at the trailing end of pipeline 18. If care has been taken in positioning the pulling barge 23 during the pulling operation, the cable will lie very close to sled 26. A lighting and underwater television system can be mounted on the sleds or lowered into position from a work boat to monitor this phase of the operation. The cable is then positioned in the cable guides 35 on each side of sled 26, either by divers or in very deep water by means of an underwater vehicle provided with manipulating devices. The valve 32 on the end of pipeline section 18 is then opened or removed to permit the entry of water. This increases the weight of the pipeline and reduces any tendency toward movement of the first pipeline section during subsequent operations. If necessary, the portion of pipeline section 18 in advance of sled 26 can be anchored to the ocean floor to further resist movement of the first section. After the cables have been positioned in the cable guides, the cable is pulled tight by means of winch 20 on barge 23. Since cable 52 extends in an essentially horizontal direction adjacent sled 26, there is little tendency to lift this sled during the pulling operation. This pulls sled 41 forward toward sled 26. Because the two sleds are initially a substantial distance apart, sled 41 can be pulled into alignment with sled 26 with relative ease. Movement of sled 41 is continued until it engages sled 26 and has been latched into place. At this point the two pipeline sections will be in substantial alignment with one another. The closure can now be removed from ell 46 to permit the entry of water into the second pipeline section 40. Cable 52 can be removed but may be left in place until the connecting operation has been completed.

In lieu of inserting the pulling cable in the cable guides 35 on sled 26 by means of a diver or manipulator as described above, it may be preferred in some cases to insert relatively short lengths of line or cable through the guides at or near the shore, to support the ends of these at the water's surface by means of one or more buoys as the sled is pulled into position, and to use these later for pulling the cable from the following sled through the cable guides. This can be done by disconnecting or severing the pulling cable at the pulling barge when the buoys are reached, splicing the short lengths of line or cable to the pulling cable, and then taking up slack on the other ends of the short lengths until the pulling cable extends from sled 41 through the cable guides 35 on sled 26 to the pulling barge. Care must be taken, of course, to avoid entanglement of the lines and cables as this is done. This procedure eliminates the need for a diver or submersible vessel fitted with a manipulator and may therefore permit a significant reduction in the cost of the overall operation.

Figure 7:
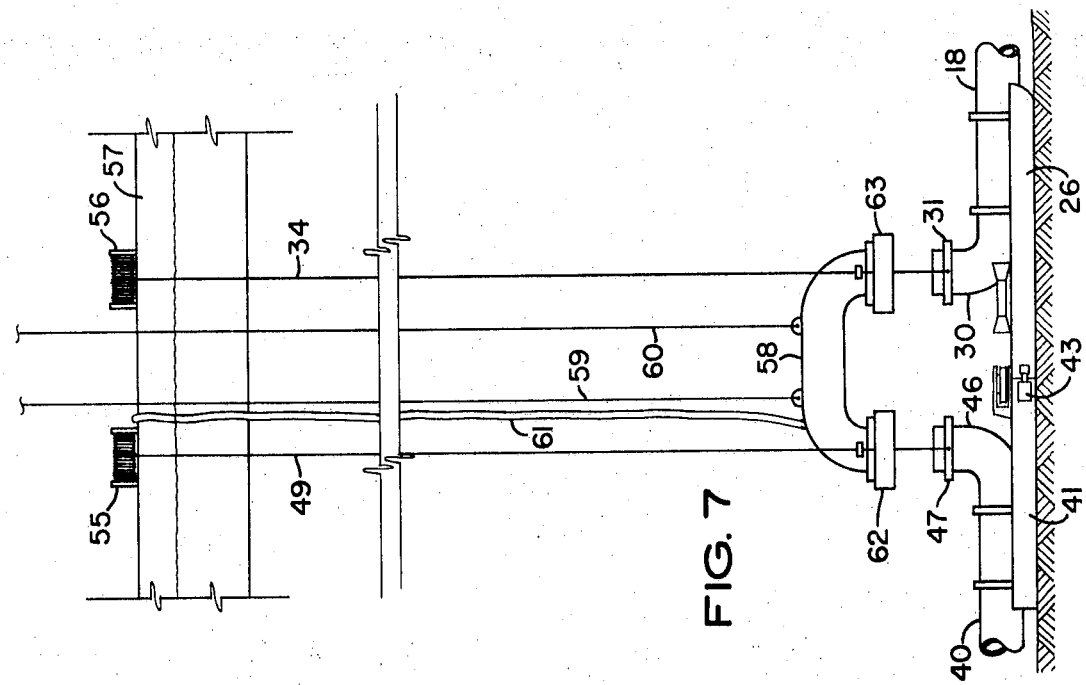
FIG. 7 illustrates the lowering into place of a connector on the guide lines to complete the connection of the two pipeline sections; and, FIGS. 8 and 9 illustrate alternate connector means that may be employed in carrying out the invention.
Figure 6:
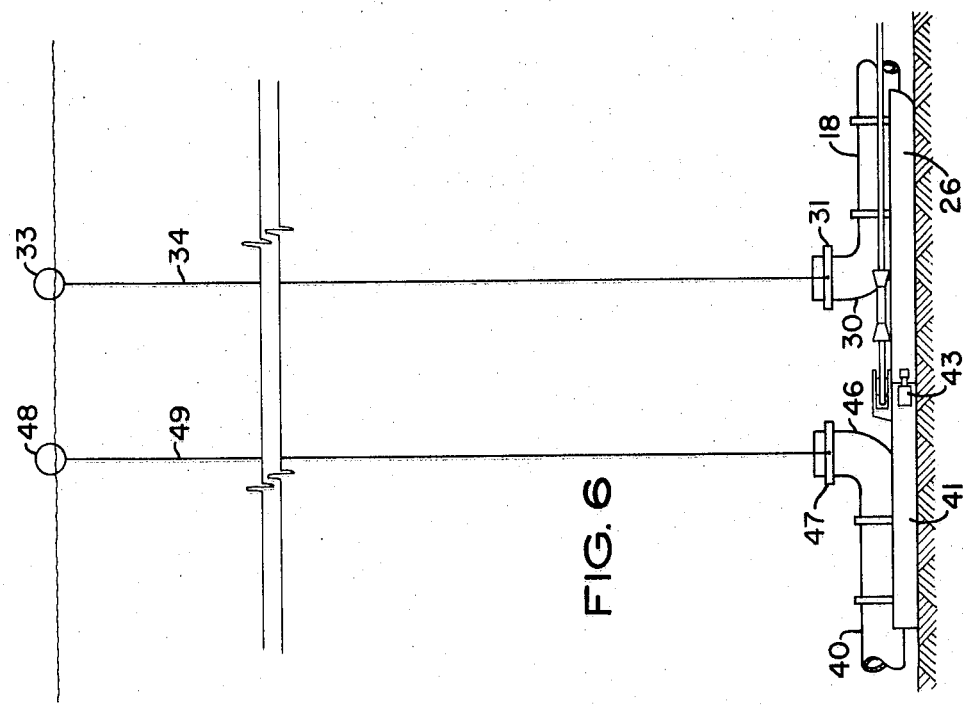
FIG. 6 illustrates a later stage in the installation operation after the sleds have been locked into place and the guide lines released.

FIG. 6 in the drawing depicts the ends of the two pipeline sections in position following the operations described above. Buoys 33 and 48 have been released and have bobbed to the surface at the ends of lines 34 and 49. As indicated earlier, these lines may be pulled taut and employed as guide lines or may instead be used for the latching in place of heavier guide cables. In FIG. 7 of the drawing, lines 34 and 49 have been taken up on by winches 55 and 56 aboard barge 57. A U-shaped connector 58 is being lowered into place over the ends of ells 30 and 46 by means of cables 59 and 60. The ends of the connector are provided with hydraulically actuated latching devices 61 and 62 which will extend over flanges 31 and 47 when the connector is in position. Once the connector has been placed, it can be actuated by hydraulic fluid pumped through line 61. Withdrawal of the hydraulic lines and cables following testing of the connections will complete the installation. It will be recognized that an underwater pipeline of any desired length can be constructed by installing the required number of pipeline segments and connecting them together as described in the preceding paragraphs.

Figure 8:
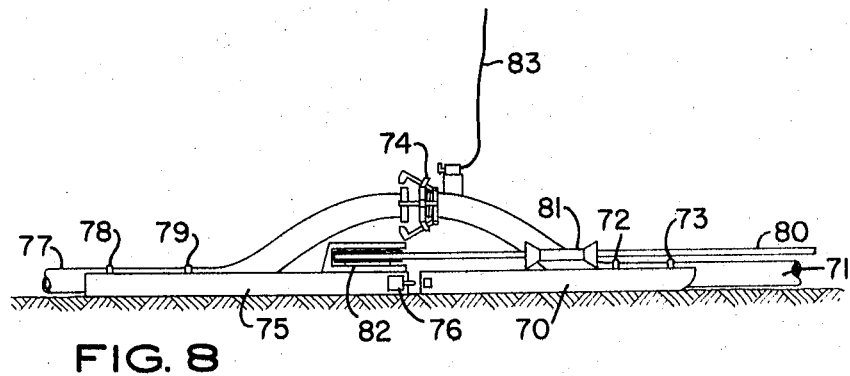

The method of the invention is not limited to use of the particular type of connector referred to above. FIG. 8 in the drawing illustrates an alternate embodiment of the invention which makes use of a different type of connecting device. Sled 70 in FIG. 8 supports the trailing end of pipeline 71, held in place by clamps 72 and 73. The end of the pipeline section is elevated above the body of the sled and fitted with an electrically actuated coupling device 74. The end of the pipeline being pulled will be plugged with an internal plug or end cap. Sled 75 engages the rear end of sled 70 and locks in place by means of latch 76. The latch is shown schematically and will normally be an automatic coupling device which locks in place by means of spring loaded dogs or similar member. The leading end of pipeline section 77, secured to sled 75 by clamps 78 and 79, is elevated above the sled so that it seats against the end of section 71 when the two sleds are engaged. Pulling cable 80 extends through cable guides 81 on sled 79, only one of which is shown, and passes around sheave 82 on sled 75. Cable 83 extends from the connector to the surface to power the connecting device. The cable may be inserted by a diver after the sleds have been engaged, may be carried on sled 70 and released following engagement, or may extend from the connector to a buoy during the pulling operation and later be recovered for connection to an electrical system aboard the pulling barge. The operation of the apparatus of FIG. 8 is essentially the same as that of the apparatus described earlier except that the connecting device is carried aboard the sled during pulling and thus does not have to be lowered in place before the connection is made. Any of several different electrically, hydraulically or mechanically actuated connecting devices may be employed in the apparatus of FIG. 8.

Figure 9:
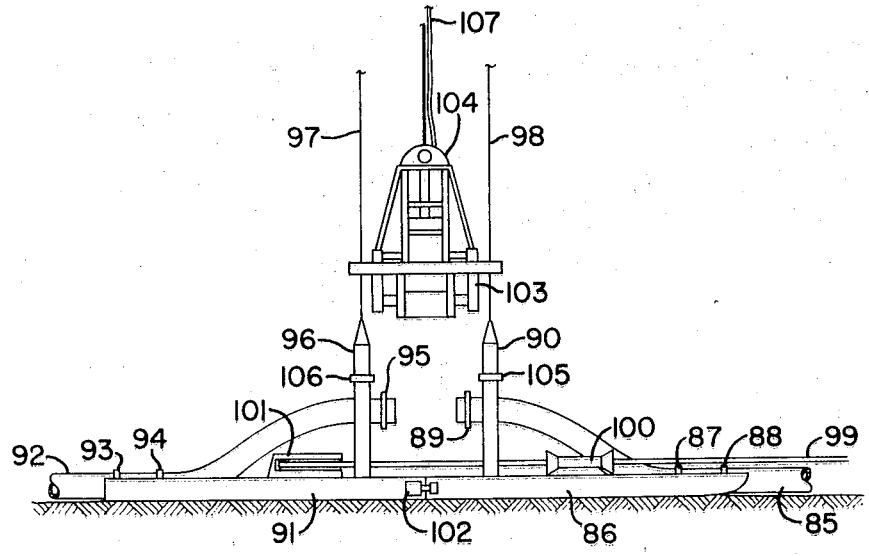

Still another embodiment of the invention is illustrated in FIG. 9 of the drawing. The trailing end of pipeline 85 is secured to sled 86 by means of clamps 87 and 88. The end of the pipeline section is elevated above the surface of the sled to facilitate placement of the connector and is provided with a flange 89 which is engaged by the connecting device. Guide posts 90, only one of which is shown in FIG. 9, are mounted on each side of sled 86. Sled 91 carries the leading edge of pipeline 92, held in place by clamps 93 and 94. The end of the pipeline section is elevated above the upper surface of the sled and provided with flange 95. Guide posts 96 are mounted on either side of sled 91 in a position comparable to the guide posts 90 on sled 86. Guide lines 97 and 98 extend from the upper ends of the guide posts to the water's surface. These guide lines may be connected to small buoys which are released to the surface in response to sonic impulses or similar signals or may be installed by divers or latching devices after the two sleds have been engaged. Pulling cable 99 extends through cable guides 100 on sled 86 and passes around sheave 101 on sled 91 to permit engagement of the sleds. Latching device 102 is provided for locking the two in place. Hydraulically actuated connector 103 is lowered into place by means of a running tool 104 on guide lines 97 and 98. Stops 105 and 106 on the guide posts limit downward movement of the running tool to assure proper placement of the connector. After the running tool and connector have been seated on the stops, the connector is actuated by hydraulic fluid pumped downwardly through hydraulic lines 107. After the connecting device has engaged the ends of the two pipeline sections and the connection has been made, the running tool is withdrawn and the guide lines can be disconnected. Remote connectors of this type are available commercially for use in underwater operations and will be familiar to those skilled in the art.

It will be apparent from the foregoing that the invention provides an improved method for the installation of underwater pipelines by pulling elongated pipeline sections into place and then connecting them which avoids many of the difficulties associated with methods employed in the past. The use of sleds and cable guides to facilitate alignment and positioning of the adjacent pipeline sections permits faster installation and reduces the cost of such operations significantly. The method can be carried out in deep water with little or no diver assistance, is operable under adverse weather conditions, and requires substantially less heavy marine equipment than many other methods.

I claim:

1. A method for the installation of an underwater pipeline on the bottom of a body of water which comprises pulling a first elongated pipeline section having a trailing end mounted on a first pulling sled into position on the bottom of said body of water, pulling a second elongated pipeline section having a leading end mounted on a second pulling sled into position on the bottom of said body of water behind said first pipeline section, pulling said second sled into end-to-end engagement with said first sled by means of a cable extending from said second sled through a cable guide on said first sled to a pulling barge, and thereafter connecting said leading end of said second pipeline section to said trailing end of said first pipeline section.

2. A method as defined by claim 1 wherein said leading and trailing ends of said pipeline sections are connected by actuating a remote connector lowered into place from the water's surface.

3. A method as defined by claim 1 wherein said leading and trailing ends of said pipeline sections are connected by actuating a connecting device carried on one of said ends.

4. A method as defined by claim 1 wherein said first and second sleds are latched together after said second sled engages said first sled.

5. A method as defined by claim 1 wherein a cable extending from said second sled is inserted in said cable guide on said first sled after said second sled has been pulled into position behind said first sled.

6. A method as defined by claim 5 wherein said cable is inserted in said cable guide by a diver.

7. A method as defined by claim 5 wherein said cable is inserted in said cable guide by means of a manipulator on an underwater vessel.

8. A method as defined by claim 5 wherein said cable is inserted in said cable guide by connecting the cable to one end of a line extending through the cable guide to the water's surface and thereafter pulling the cable into place within the guide.

9. A method as defined by claim 1 wherein said first pipeline section is flooded with water after said first section has been pulled into position and before said cable is inserted in said cable guide.

10. A method as defined by claim 1 wherein the ends of said second pipeline section are initially closed off to prevent the entry of water and said second section is flooded with water after said second sled has been pulled into engagement with said first sled.

* * * * *